(12) United States Patent
Jo et al.

(10) Patent No.: US 10,446,913 B2
(45) Date of Patent: Oct. 15, 2019

(54) MOBILE TERMINAL (71) Applicant: LG ELECTRONICS INC., Seoul (KR)

(72) Inventors: Junghyun Jo, Seoul (KR); Younghun Song, Seoul (KR); Jungwon Kim, Seoul (KR); Minsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 15/351,020

(22) Filed: Nov. 14, 2016

(65) Prior Publication Data
US 2017/0373376 A1 Dec. 28, 2017

(30) Foreign Application Priority Data
Jun. 24, 2016 (KR) .................. 10-2016-0079564

(51) Int. Cl.
*H01Q 1/24* (2006.01)
*H01Q 1/38* (2006.01)
*H01Q 1/50* (2006.01)
*H04M 1/02* (2006.01)
*H01Q 1/08* (2006.01)

(52) U.S. Cl.
CPC ............ *H01Q 1/243* (2013.01); *H01Q 1/088* (2013.01); *H01Q 1/38* (2013.01); *H01Q 1/50* (2013.01); *H04M 1/0202* (2013.01); *H04M 1/026* (2013.01); *H04M 1/0277* (2013.01)

(58) Field of Classification Search
CPC ............ H01Q 1/243; H01Q 1/50; H01Q 1/38; H01Q 1/088; H04M 1/0277; H04M 1/026; H04M 1/0202
See application file for complete search history.

(56) References Cited

U.S. PATENT DOCUMENTS

| | | | |
|---|---|---|---|
| 2006/0111162 A1 | 5/2006 | Seol et al. | |
| 2011/0084886 A1* | 4/2011 | Ogatsu | H01Q 1/242 343/702 |
| 2011/0221639 A1* | 9/2011 | Jeon | B29C 45/14065 343/702 |
| 2013/0318766 A1* | 12/2013 | Kiple | B23P 11/00 29/428 |
| 2014/0002315 A1 | 1/2014 | Lim | |
| 2016/0018856 A1 | 1/2016 | Heo et al. | |

(Continued)

FOREIGN PATENT DOCUMENTS

| | | |
|---|---|---|
| EP | 2 366 526 A1 | 9/2011 |
| EP | 3 024 088 A1 | 5/2016 |
| JP | 2006-148943 A | 6/2006 |

(Continued)

*Primary Examiner* — Hai V Tran
*Assistant Examiner* — Michael M Bouizza
(74) *Attorney, Agent, or Firm* — Birch, Stewart, Kolasch & Birch, LLP (57) ABSTRACT

There is disclosed a mobile terminal including a display unit, a front case of which a front surface the display is mounted, a rear case coupled to a rear surface of the front case, a main board loaded between the front case and the rear case, and a side case coupled to one or more side surfaces of the front and rear cases, wherein the side case comprises an inner injection mold projected toward the front case and the rear case, an outer injection mold exposed externally and an antenna pattern disposed between the inner injection mold and the outer injection mold.

16 Claims, 9 Drawing Sheets

(56) References Cited

U.S. PATENT DOCUMENTS

2016/0104930 A1* 4/2016 Lee .................. H01Q 1/243
                                                    343/702
2016/0149290 A1* 5/2016 Park ................. H01Q 1/243
                                                    343/702

FOREIGN PATENT DOCUMENTS

| JP | 2014-11796 A | 1/2014 |
| KR | 10-2012-0010922 A | 2/2012 |
| KR | 10-1397747 B1 | 5/2014 |
| KR | 10-2016-0016153 A | 2/2016 |
| KR | 10-1622731 B1 | 5/2016 |

* cited by examiner

MOBILE TERMINAL

CROSS-REFERENCE TO RELATED APPLICATIONS

The present application claims priority to Korean Application No. 10-2016-0079564, filed Jun. 24, 2016, the contents of which are hereby expressly incorporated by reference in its entirety.

BACKGROUND OF THE DISCLOSURE

Field of the Disclosure

Embodiments of the present disclosure relate to a mobile terminal which facilitates antenna loading by securing certain space for arranging antenna and has improved antenna performance.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Diverse communication supports are needed to support and improve such the functions of the mobile terminal and more space for loading an antenna is needed to load diverse communication types of antennas. With development of LTE techniques, the number of antennas needed for LTE communication is increasing and it is necessary to expand the space for antenna loading.

Interference occurs between antennas and internal electronic components are likely to affect the antenna. It is difficult to secure a sufficient space for loading the antenna in the mobile terminal of which the downsizing is the current trend.

SUMMARY OF THE DISCLOSURE

An object of the present disclosure is to provide a mobile terminal having an antenna loading structure configured to secure a space for antenna loading.

Embodiments of the present disclosure may provide a mobile terminal that includes a front case, a display unit mounted at the front case, a rear case placed to a rear side of the front case, a main board loaded between the front case and the rear case, and a side case coupled to one or more side of the front and rear cases, wherein the side case comprises an inner injection mold projected toward the front case and the rear case, an outer injection mold exposed externally, and an antenna pattern disposed between the inner injection mold and the outer injection mold.

The side case may comprise a first portion located in a front surface of the front case, a second portion located in a rear surface of the rear case, a third portion covering an overall first side surface of the mobile terminal, and a fourth portion and a fifth portion partially covering a second side surface and a third side surface of the mobile terminal which are located on the left and right sides of the first side surface, respectively.

The side case may be located at least one of the upper side surface or lower surface of the mobile terminal.

The mobile terminal may further comprise a first hook projected from at least one of the front case or rear case, and a second hook projected from the side case, corresponding to the first hook, and wherein the side case may be pushed from the first side surface toward the front and rear cases and the first hook then engages with the second hook.

The side case may further comprise a screw fastening portion provided in a rear surface of the rear case, and a screw fastened to the rear case after penetrating the screw fastening portion.

The mobile terminal may further comprise a rear cover covering the screw fastening portion and the rear surface of the rear case.

The mobile terminal may further comprise a connection part for exposing the antenna pattern externally by omitting a predetermined portion of the inner injection mold, and a connection clip mounted in the main board and connected with the connection part.

The connection clip may be projected at the rear case and comprises an inclined surface inclined toward the first side surface.

The connection clip may be projected toward the first side surface of the mobile terminal.

The mobile terminal may further comprise a flexible board connected with the front case or the rear case and having a conductivity pattern, wherein the conductivity pattern is electrically connected with the antenna pattern.

The flexible board may be coupled to a front top end of the front case, and the flexible board may comprise a connection part connected with the main board by bending toward the rear surface of the front case.

Unevenness may be formed in an inner surface of the inner injection mold, and a flat surface may be formed in an outer surface of the inner injection mold and an inner continuously.

The outer injection mold may have a uniform thickness.

The thickness of the outer injection mold may be 0.3 mm or more and 0.8 mm or less.

The side case may be integrally formed by double-injection molding in such a manner that the inner injection mold injection-molded and the antenna pattern is formed in an outer surface of the inner injection mold and then the outer injection mold is double-injection molded.

According to the present disclosure, the mobile terminal in accordance with the present disclosure may secure the sufficient space for mounting the antenna pattern. Accordingly, the antenna pattern of the mobile terminal has a freer design.

Furthermore, the antenna pattern of the mobile terminal in accordance with the present disclosure is arranged closer to the outer surface of the case than the conventional antenna pattern. Accordingly, the antenna performance can be improved.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
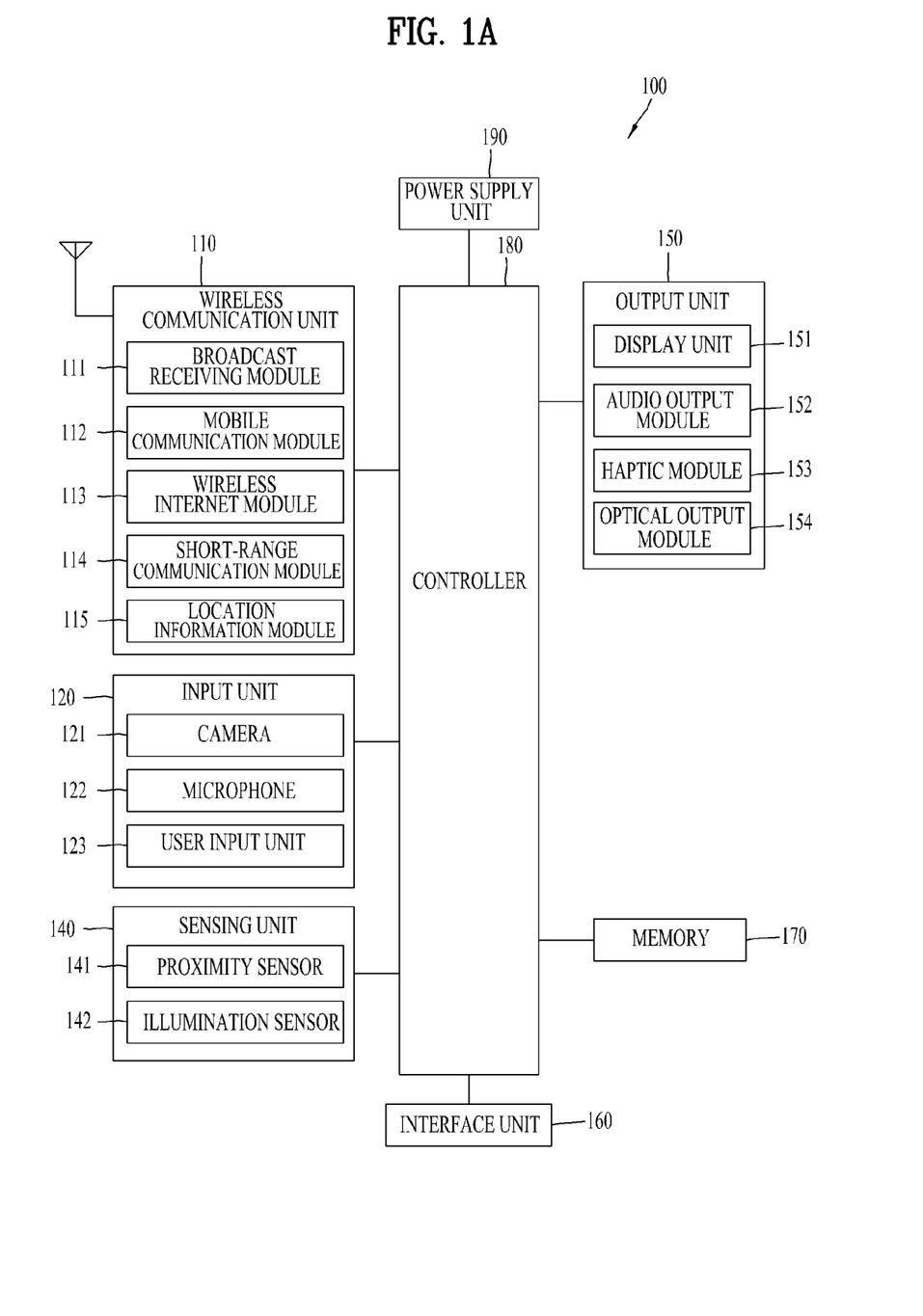
FIG. 1A is a block diagram of a mobile terminal in accordance with the present disclosure.
Figure 1B:
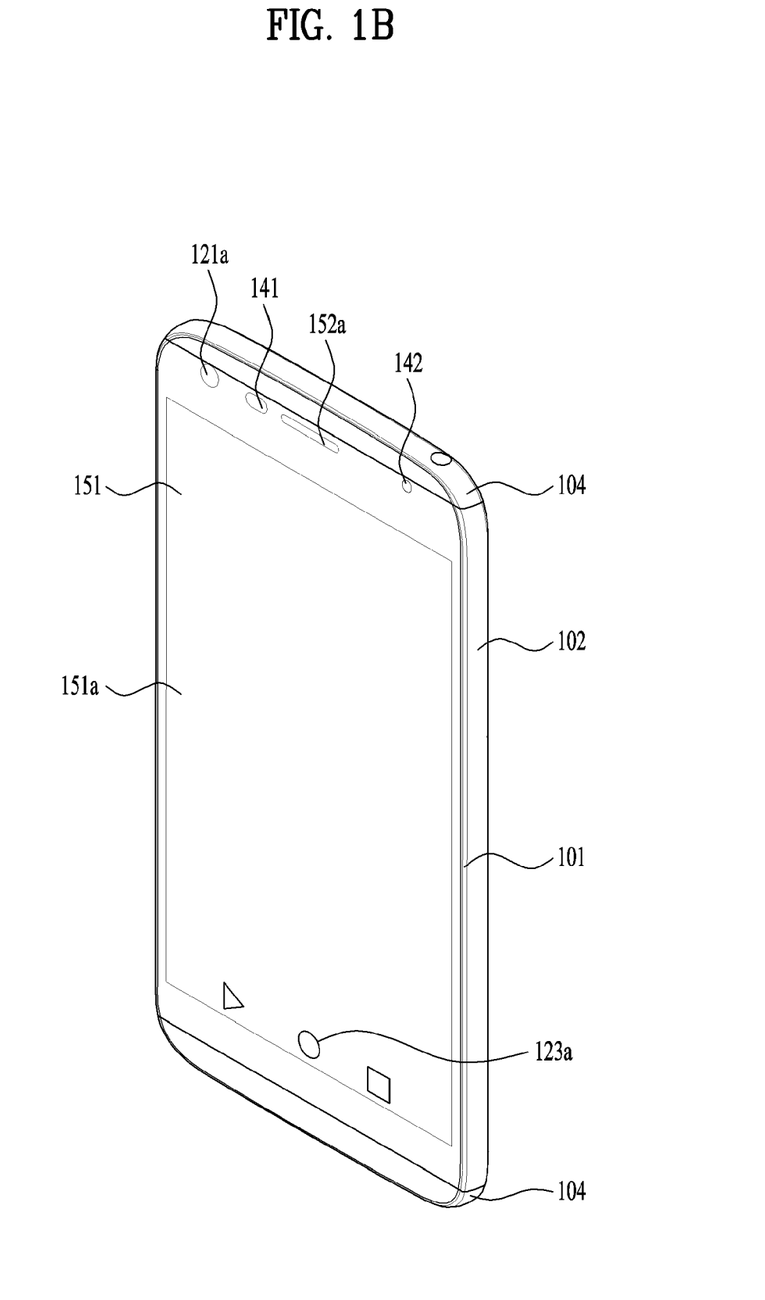
FIGS. 1B and 1C are conceptual views of one example of the mobile terminal, viewed from different directions.
Figure 1C:
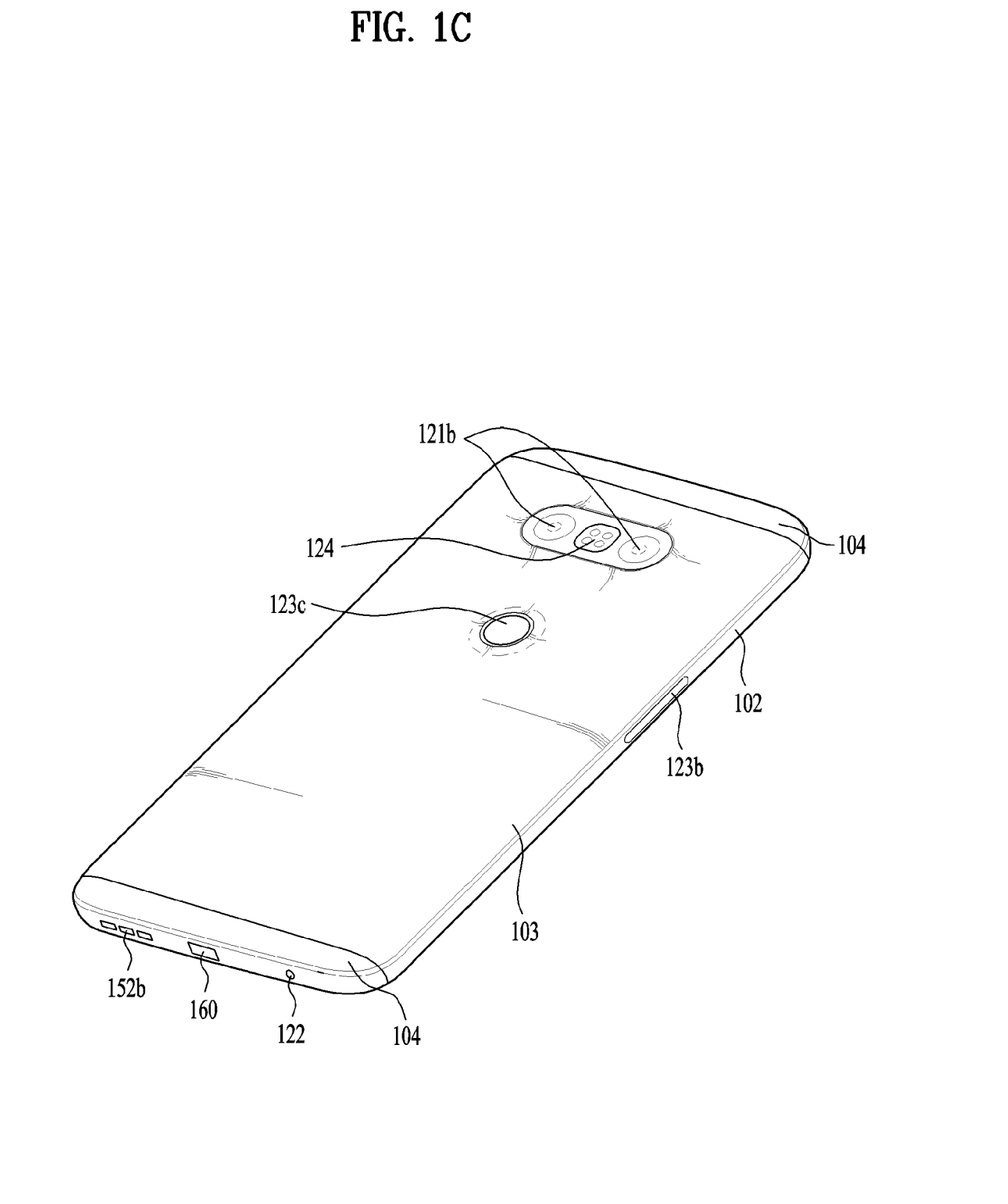

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190.

It is understood that implementing all of the illustrated components in The FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. A side case covering a lateral side of the mobile terminal may be further provided as well as the front case and the rear case.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 152a/152b, a proximity sensor 141, an illumination sensor 142, an optical output module 154, a first and a second cameras 121a/121b, first and second manipulation unit 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 2:
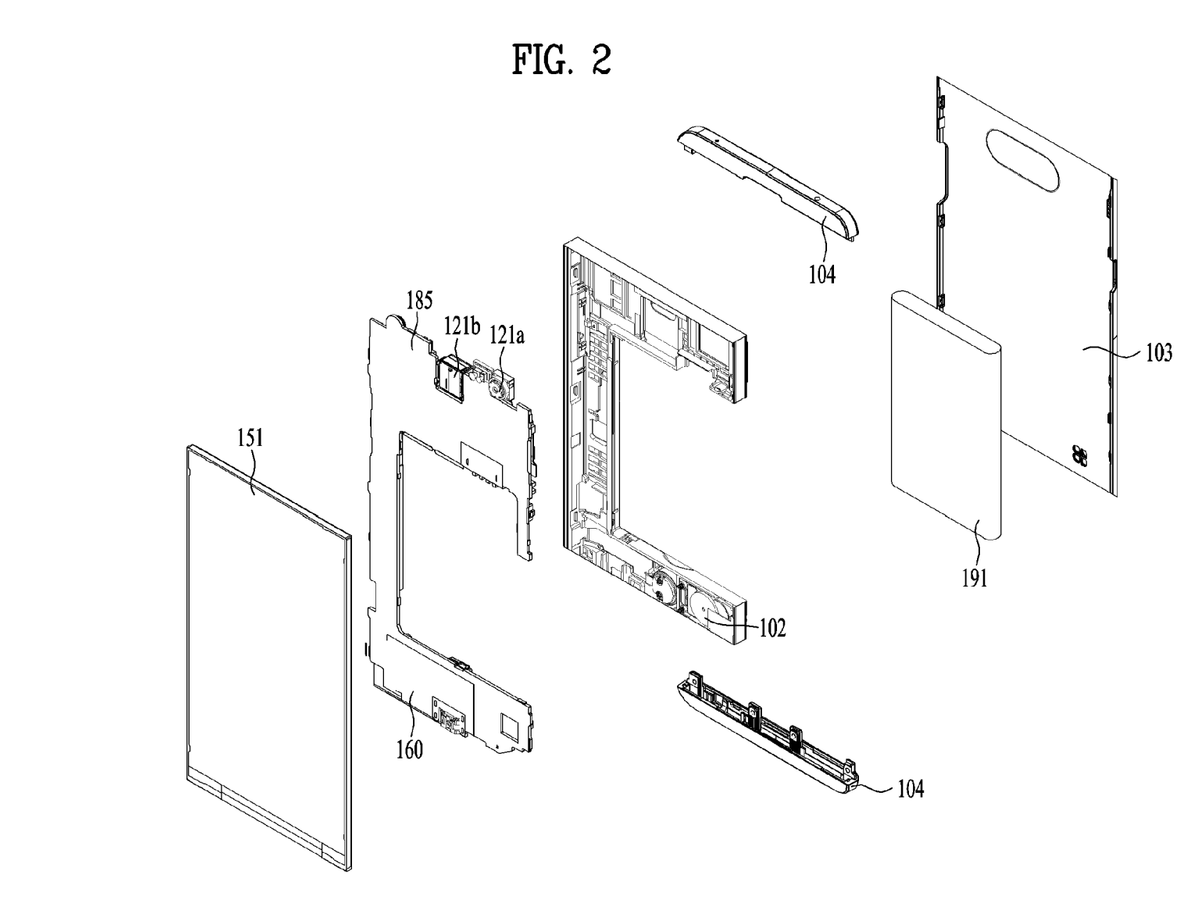
FIG. 2 is an exploded perspective diagram of one example of the mobile terminal.

An accessory for protecting an appearance or assisting or extending the functions of the mobile terminal 100 can be also provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen FIG. 2 is an exploded perspective diagram of one example of the mobile terminal 100 and FIG. 3 is a sectional diagram illustrating the side case 104 provided in one example of the mobile terminal and shows the display unit 151, the front case 101, the rear case 102, the main board 185, the battery 191 and the side case 104.

The mobile terminal 100 further includes the side case 104 as well as the front case 101 and the rear case 102. The side case 104 shown in FIG. 2 covers upper and lower side surface or right and left side surfaces. However, right and left bezel (edge portion of the display) is quite small in the example of the mobile terminal 100 so that it is preferred that the side case 104 is located in upper and lower surfaces of the mobile terminal 100. The side case 104 may cover only one side surface. Two side cases 104 are located in the upper and lower sides or one side case 104 is located only in one surface.

According to the assembling order, the display unit 151 is disposed on the front surface of the front case 101 and the internal components including the main board 185 and the like are loaded in a back surface of the front case 101. After that, the rear case 102 is coupled to the back surface of the front case and the side case 104 is coupled to the case configured of the front and rear cases coupled as one body and the rear cover 103 is coupled to the back surface of the rear case 102.

Figure 3:
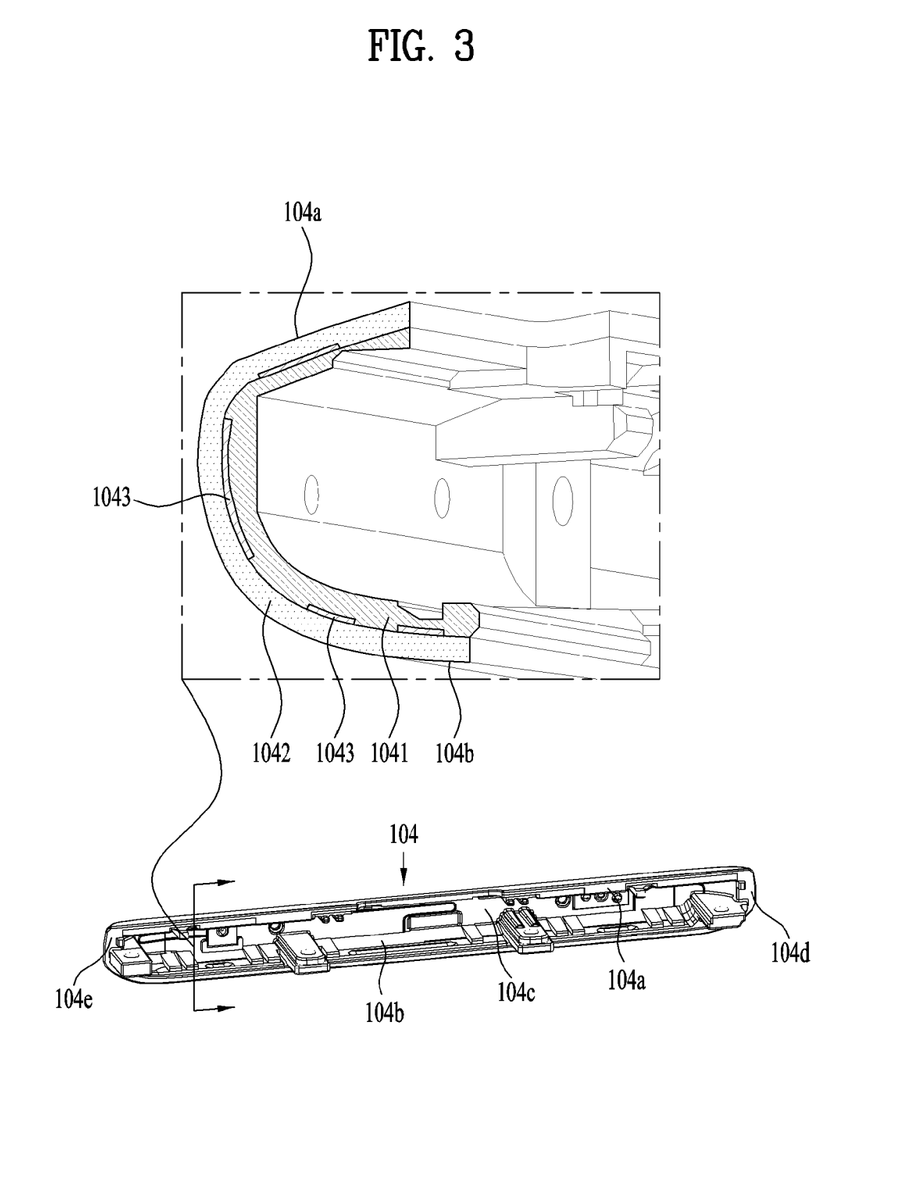
FIG. 3 is a sectional diagram illustrating a side case provided in one example of the mobile terminal.

The side case 104 shown in FIG. 3 includes an inner injection mold 1041, an external injection mold 1042 and an antenna pattern 1043 disposed between the inner and outer injection molds 1041 and 1042. The inner injection mold 1041 and the external injection mold 1042 are made of a non-conductive material and the antenna pattern 1043 made of a conductive material. The inner injection mold 1041 is formed toward the front case 101 and the rear case 102 and not exposed externally in a state where the components are loaded. The outer injection mold 1042 is externally exposed in the manufactured good of the mobile terminal and forming the exterior appearance of the mobile terminal 100.

The side case 104 may be formed in such a manner that the antenna pattern 1043 is formed in an outer surface of the inner injection mold 1041 and the external injection mold 1042 is injection-molded, the inner injection mold 1041 is injection-molded. The antenna pattern 1043 exposed externally is likely to deteriorate the exterior design. A conventional antenna pattern 1043 is usually attached to an inner or outer surface of the case after being realized by using an auxiliary FPCB. As another example, the conventional antenna pattern 1043 has the design configured for using the rear cover 103 in covering the antenna pattern 102 formed in an outer surface of the rear case 102 so as not to expose the antenna pattern.

However, the antenna pattern 1043 has the higher performance when located in an outer surface of the case. Some electromagnetic waves pass through the injection mold covering the antenna pattern. As the injection mold is getting thicker, electromagnetic waves have difficulty in passing through the injection mold covering the antenna pattern and there could be the deteriorated performance of the antenna pattern. In addition, the antenna pattern has the higher performance if spaced apart from the internal components and it is preferred that the antenna pattern is located in the outer portion of the case as possible.

The antenna pattern 1043 exposed outside is likely to deteriorate the exterior design. As another aspect, the antenna pattern 1043 has to be located in the external portion of the case as possible to secure the good performance of the antenna pattern 1043. To solve the two disadvantages, the side case 104 in accordance with the present disclosure may be formed in two layers and the antenna pattern 1043 is formed between the inner injection mold 1041 and the outer injection mold 1042. Accordingly, the injection mold of the antenna pattern 1043 located in the outer portion can be minimized. After the inner injection mold 1041 is injection-molded, the antenna pattern 1043 is formed in the outer surface of the inner injection mold 1041 and the outer injection mold 1042 is then formed by double-injection molding.

The thickness of the case may be usually determined as 1 mm or more. If the thickness of the inner injection mold 1041 is equal to that of the outer injection mold 1042, the antenna pattern 1043 is 0.5 mm deep in the outer surface and has higher performance than the conventional antenna pattern. The thickness of the outer case is 0.3 mm or more and 0.8 mm or less, so that the injection mold for covering the antenna pattern 1043 can be formed thinner.

The distance between the antenna pattern 1043 and the internal components is equal to the thickness of the inner injection mold 1041, so that the antenna pattern 1043 can be affected less by the internal electronic components.

Unevenness is formed in an inner surface of the inner injection mold 1041, corresponding to the front case 101, the rear case 102 and the diverse components. For example, the portion where the earphone jack or the interface unit is arranged has to be formed relatively thinner.

The inner surface of the inner injection mold 1041 is formed uneven and the antenna pattern 1043 has to be formed in a flat portion of the inner injection mold 1041 as possible, avoiding the unevenness. If the antenna pattern 1043 is formed in the unevenness, the portion of the antenna pattern located in corners of the unevenness might get worn out and damaged and the performance of the antenna might become affected. The space for loading the antenna is limited if the antenna pattern 1043 is formed in the inner surface of the case.

However, in the side case 104 having the structure mentioned above, unevenness is formed in the inner surface of the inner injection mold 1041 and an outer surface is flat. The overall area of the side case 104 may be utilized as the space for loading the antenna pattern 1043.

Figure 4:
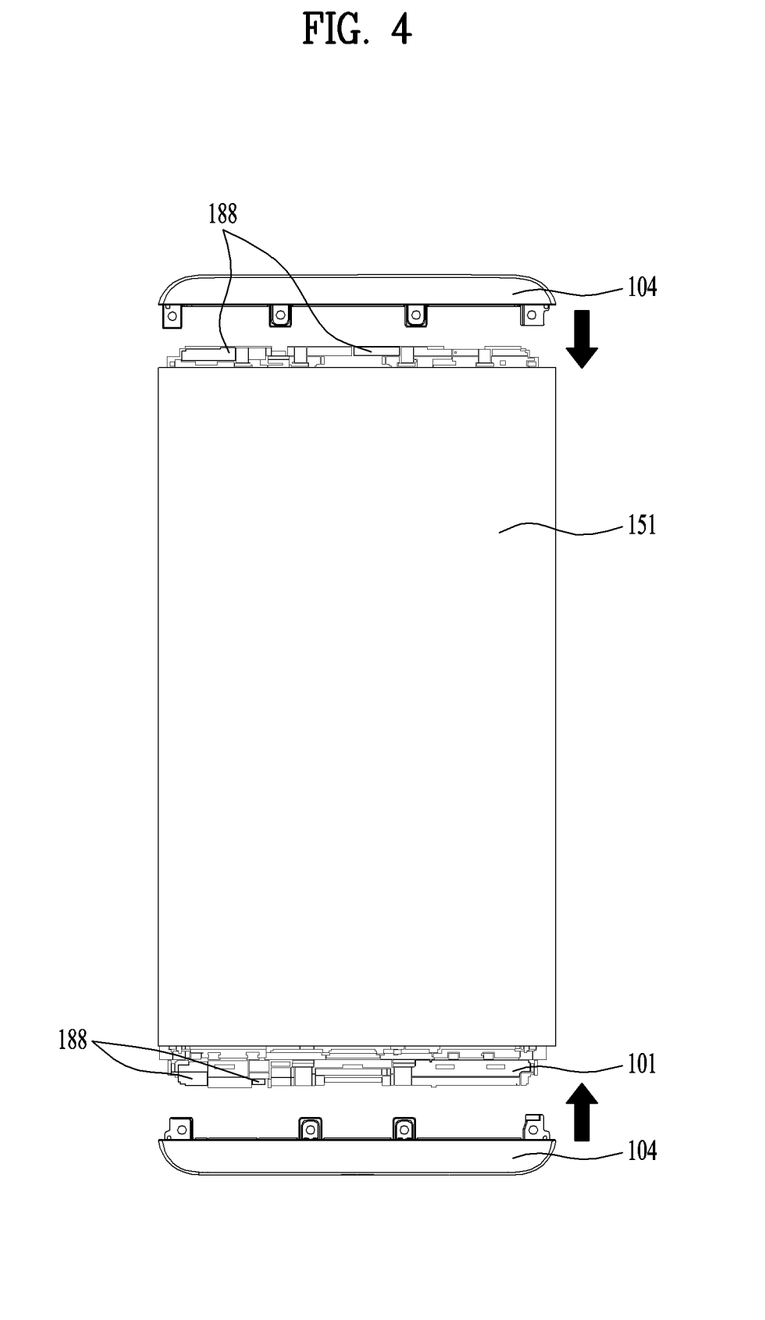
FIGS. 4 through 6 are diagrams illustrating an assembling process of the side case provided in one example of the mobile terminal.

The side case 104 shown in FIG. 4 has a cap-like shape and includes a first portion 104*a* covering the front surface of the front case 101, a second portion 104*b* covering a rear surface of the rear case 102, a third portion 104*c* covering upper surfaces or lower surfaces (in other words, first side surfaces) of the front and rear cases 101 and 102, fourth and fifth portions 104*d* and 104*e* covering left and right surfaces (in other words, second and third side surfaces).

Figure 5:
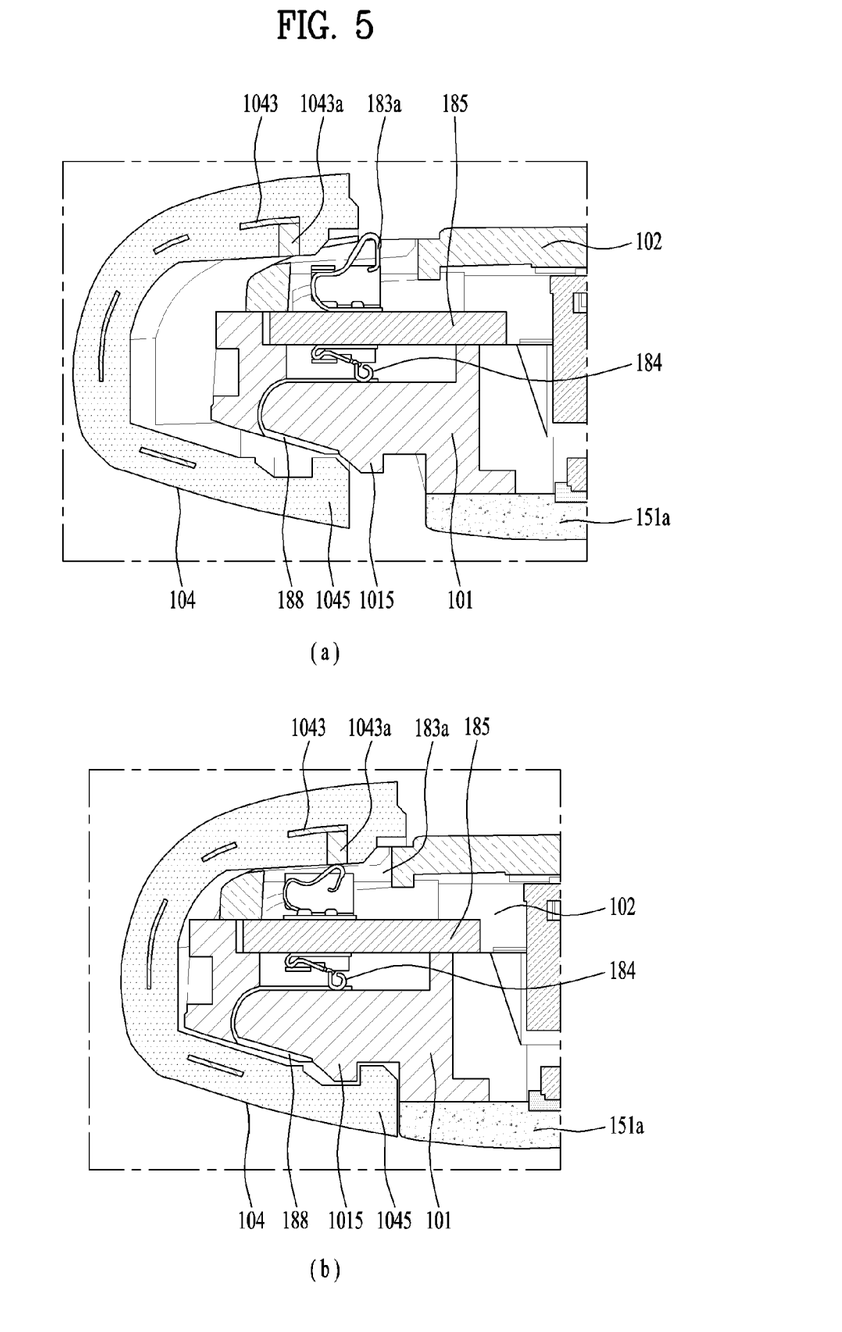
Figure 6:
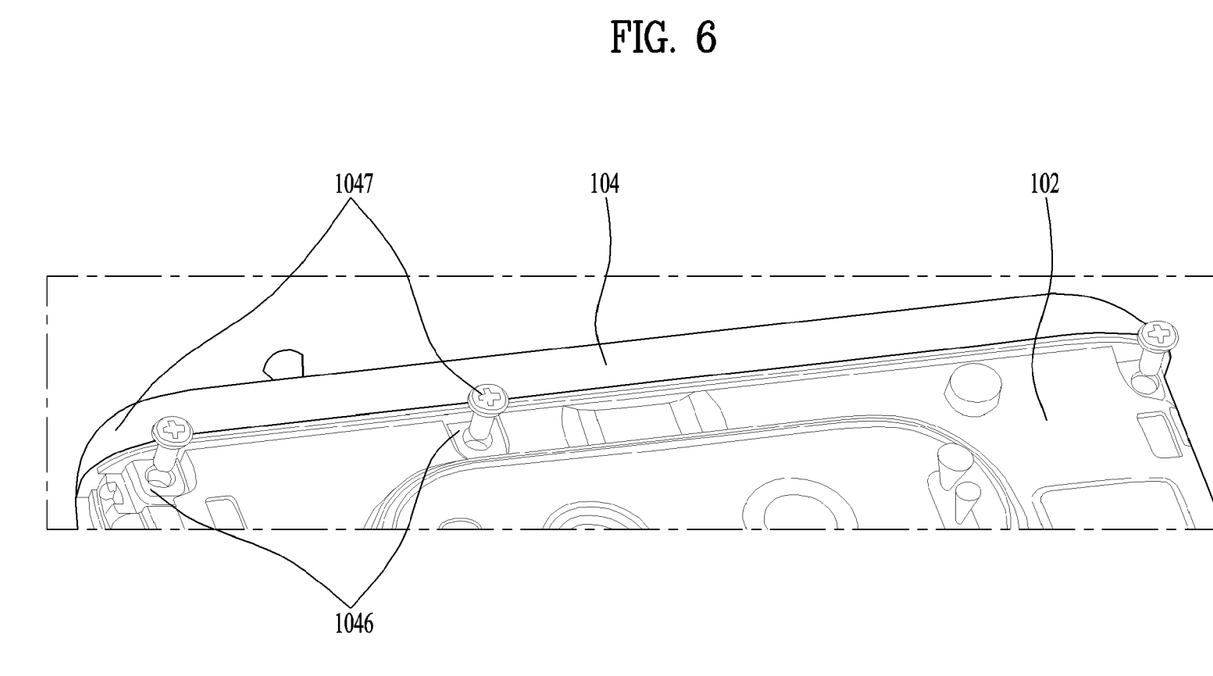

FIGS. 4 through 6 are diagrams illustrating an assembling process of the side case 104 provided in one example of the mobile terminal 100.

After the assembling process of coupling the display unit 151, the front case 101, the main board 185 and the rear case 102 to each other, the side case 104 is coupled to upper and lower side surfaces of the front and rear cases 101 and 102.

When a right-and-left direction is referred to as X-axis direction, a up-and-down direction as Y-axis direction and a direction along the thickness of the mobile terminal as Z-direction direction, the cap-shaped side case 104 may not be coupled in Z-axis direction (the direction from the front side to the rear side or the reverse direction). Accordingly, the side case 104 is insertedly coupled to the front case 101 and rear case 102 in the direction from a first side surface toward the front case 101 and the rear case 102 (in other words, Y-axis direction or X-axis direction if the side case 104 is coupled to the right and left side surfaces).

As shown in FIG. 5, a first hook 1015 projected outwards from one or more of the rear and front cases 102 and 101 and a second hook 1045 engaging with the first hook 1015 may be provided in an inner surface of the side case 104. When the side case 104 is pushed along Y-axis direction, the first hook 1015 and the second hook 1045 engage with each other to couple the side case 104 to the front and rear cases 101 and 102. The first portion 104*a* of the side case 104 supports the front surface of the front case 101 and the second portion 104*b* supports the rear surface of the rear case 102, only to prevent the front and rear cases 101 and 102 from getting widened from each other.

Even when the side case 104 is secured by using the hooks, the front case 101 and the rear case 102 are likely to get widened from each other. A screw 1047 is further fastened as shown in FIG. 6. The side case 104 may further include a screw fastening portion 1046 to be located in the rear surface of the rear case 102 and a screw 1047 is fastened to the rear case 102, penetrating the screw fastening portion 1046. The first through fifth portions 104*a*~104*e* of the side case 104 are exposed outside and the screw fastening portion 1046 is not exposed outside but covered with the rear cover 103.

Some portion of the inner injection mold 1041 is omitted and a connection part 1043*a* of the antenna pattern 1043 is exposed outside so as to connect the antenna pattern disposed between the inner injection mold 1041 and the outer injection mold 1042 with the wireless communication unit loaded in the main board 185.

When the side case 104 is insertedly coupled, the connection part 1043a of the antenna pattern 1043 exposed via the inner injection mold 1041 may contact with a connection clip 183a mounted in the main board 185. The conventional antenna is coupled to the rear case 102 and the connection clip 183a contacts with the connection part 1043a of the antenna pattern 1043 in Z-axis direction. However, the side case 104 is pushed and coupled along Y-axis direction and the connection clip 183a is different from a conventional connection clip.

Referring to FIG. 5 (a), the connection clip 183a has an inclined surface toward the side case 104. The side case 104 getting coupled insertedly pushes the inclined surface of the connection clip 183a and the connection clip 183a is bending to become connected with the connection part 1043a exposed internally in the side case 104.

Figure 7:
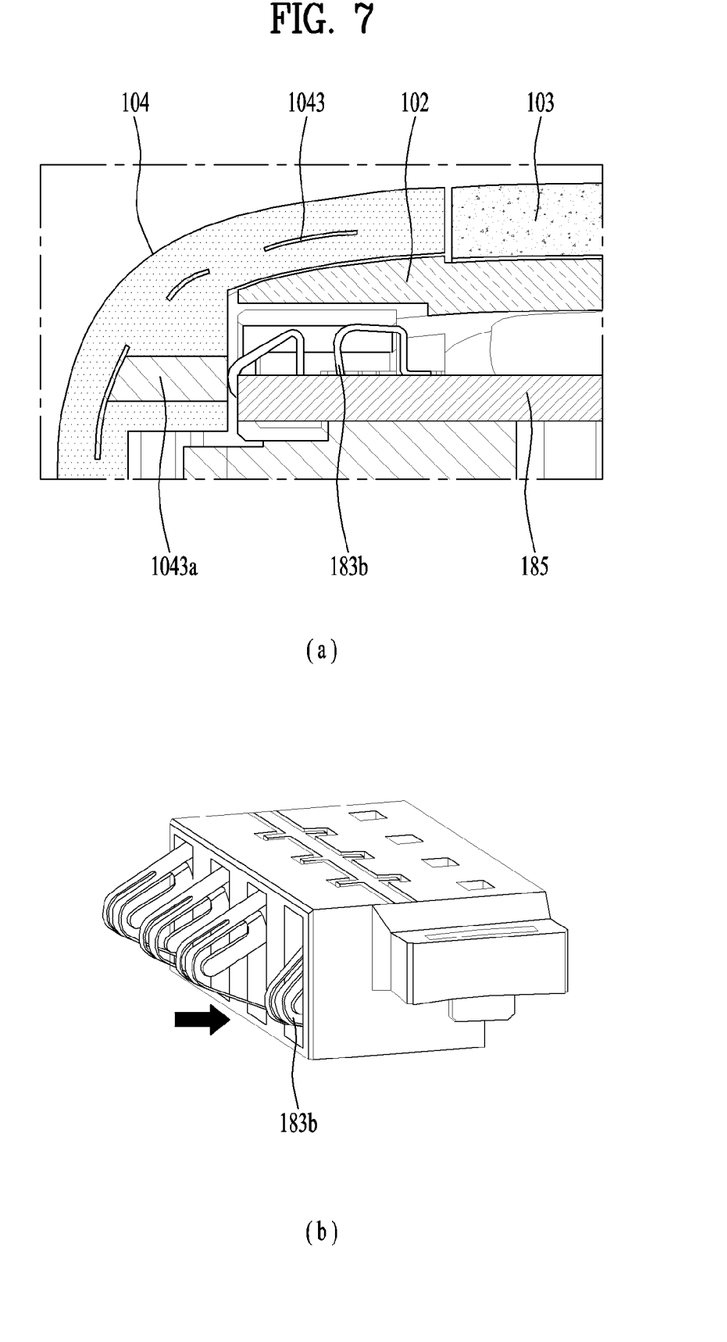
FIG. 7 is a diagram illustrating another example of a connection clip provided in one example of the mobile terminal.

FIG. 7 is a diagram illustrating another example of a connection clip provided in one example of the mobile terminal 100. In the illustrated example of FIG. 7 (a), the connection part 1043a is located in the third portion and the connection clip 183b is also projected to Y-axis direction of the mobile terminal 100. The connection clip 183b of the illustrated example is not projected in the direction toward the thickness of the mobile terminal 100 and has not so much height restriction. As shown in FIG. 7 (b), the connection clip 183b may be longitudinally formed in Y-axis direction.

In case of receiving a plurality of signals in various frequency band rages, a plurality of connection parts 1043a may be provided and a plurality of connection clips 183b may be also provided to get connected with the plurality of the connection parts 1043a, respectively. As shown in FIG. 7 (b), the plurality of the connection clips 183b may be configured as one module to reduce the number of the components and assembling processes when mounding the plurality of the connection clips 183b on the main board 185.

If the antenna pattern 1043 disposed between the inner injection mold 1041 and the outer injection mold 10 of the side case 104 is not long enough, the length of the radiator may be lengthened by using a conductive material to gain the radiator having the corresponding length to the wavelength of the antenna frequency.

For example, a flexible board 188 may be used. The flexible board 188 has a conductivity pattern which is able to be connected with the antenna pattern 1043 to increase the length of the antenna radiator. In this instance, the connection with the antenna pattern 1043 is performed by the flow of electric currents so that it is not necessary to directly connect the flexible board 188 with the antenna pattern and the flexible board 188 may be indirectly connected with the antenna pattern 185 via the main board 185.

Referring to FIG. 4, the flexible board 188 may be located in the connecting portion between the front case 101 and the side case 104, not connected with the display unit. Certain portion of the conductivity pattern of the flexible board 188 is bent toward the rear surface to be connected with the main board 185 to be connected with the main board 185 loaded in the rear surface of the front case 101 as shown in FIG. 5. A connection clip 184 may be used in the connection of the flexible board 188. The connection clip 184 used in connecting the flexible board 188 with the mainboard 185 may be projected in a different direction from the direction in which the connection clips 183a and 183b for the connecting with the antenna pattern 1043 are projected.

As mentioned above, the mobile terminal 100 in accordance with the present disclosure may secure the sufficient space for mounting the antenna pattern. Accordingly, the antenna pattern of the mobile terminal 100 has a freer design. In addition, the antenna pattern of the mobile terminal in accordance with the present disclosure is arranged closer to the outer surface of the case than the conventional antenna pattern. Accordingly, the antenna performance can be improved.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a front case having a front side and a rear side;
   a display at the front case;
   a rear case at the rear side of the front case;
   a main board located between the front case and the rear case;
   a side case coupled to one or more portions of the front and rear cases, the side case including:
      a non-conductive inner injection mold projected toward the front case and the rear case;
      a non-conductive outer injection mold externally exposed; and
      a conductive antenna pattern located between the inner injection mold and the outer injection mold in a thickness direction of the side case; and
   a flexible board having a conductivity pattern electrically connected to the antenna pattern to lengthen the antenna pattern, wherein the flexible board is electrically connected to the antenna pattern via the main board,
   wherein the flexible board is coupled to a front top end of the front case such that the flexible board is bent along the front top end of the front case, and
   wherein the flexible board includes a connection part connected to the main board.

2. The mobile terminal of claim 1, wherein the front case, the rear case, and the side case form a terminal body, and wherein the side case includes:
   a first portion located in a front surface of the front side of the front case;
   a second portion located in a rear surface of the rear case;
   a third portion defining an overall first side surface of the terminal body; and
   a fourth portion and a fifth portion partially defining second and third side surfaces, respectively, of the terminal body, the second and third side surfaces being located on the left and right sides of the first side surface, respectively.

3. The mobile terminal of claim 2, wherein the side case is located at at least one of the upper portion or lower portion of the mobile terminal.

4. The mobile terminal of claim 2, further comprising:
   a first hook projected from at least one of the front case or the rear case; and
   a second hook projected from the side case, the second hook being configured to correspond to the first hook such that, when the side case is pushed toward the front and rear cases, the first hook engages the second hook.

5. The mobile terminal of claim 2, further comprising:
a connection part of the antenna pattern being exposed through the side case by omitting a predetermined portion of the inner injection mold; and
a connection clip located at the main board, the connection clip being connected to the connection part.

6. The mobile terminal of claim 5, wherein the connection clip projects from the rear case, the connection clip having an inclined surface inclined toward the first side surface.

7. The mobile terminal of claim 5, wherein the connection clip projects toward the first side surface.

8. The mobile terminal of claim 1, wherein the side case further comprises:
a screw fastening portion at a rear surface of the rear case; and
a screw penetrating the screw fastening portion to fasten the side case to the rear case.

9. The mobile terminal of claim 8, further comprising a rear cover covering the screw fastening portion and the rear surface of the rear case.

10. The mobile terminal of claim 1, wherein the flexible board extends from the front case.

11. The mobile terminal of claim 10, wherein the connection part of the flexible board is bent toward the rear side of the front case.

12. The mobile terminal of claim 1, wherein an inner surface of the inner injection mold facing the front case and the rear case is uneven, and
wherein an outer surface of the inner injection mold facing away from the front case and the rear case is smooth except for where the antenna pattern is located.

13. The mobile terminal of claim 1, wherein the outer injection mold has a uniform thickness.

14. The mobile terminal of claim 1, wherein the thickness of the outer injection mold is between 0.3 mm and 0.8 mm.

15. The mobile terminal of claim 1, wherein the side case is integrally formed by first injection molding the inner injection mold and the antenna pattern and then injection molding the outer injection mold and the combined inner injection mold and antenna pattern.

16. A mobile terminal comprising:
a front case having a front side and a rear side;
a display at the front case;
a rear case at the rear side of the front case;
a main board located between the front case and the rear case;
a first side case coupled to the front and rear cases to define an upper portion of the mobile terminal;
a second side case coupled to the front and rear cases to define a lower portion of the mobile terminal,
wherein each side case includes:
a non-conductive inner injection mold projected toward the front case and the rear case;
a non-conductive outer injection mold externally exposed; and
a conductive antenna pattern located between the inner injection mold and the outer injection mold in a thickness direction of the side case; and
a flexible board having a conductivity pattern electrically connected to the antenna pattern to lengthen the antenna pattern, wherein the flexible board is electrically connected to the antenna pattern via the main board,
wherein the flexible board is coupled to a front top end of the front case such that the flexible board is bent along the front top end of the front case, and
wherein the flexible board includes a connection part connected to the main board.

* * * * *